United States Patent
Nomura et al.

(10) Patent No.: US 9,752,862 B2
(45) Date of Patent: Sep. 5, 2017

(54) ACCELERATOR OPENING DEGREE DETECTION DEVICE

(75) Inventors: Yoshihiro Nomura, Wako (JP); Yuichi Kawasaki, Kunitachi (JP); Isao Shokaku, Niiza (JP); Nobuo Shigemizu, Saitama-ken (JP); Masaru Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/125,961

(22) PCT Filed: Jun. 30, 2011

(86) PCT No.: PCT/JP2011/065050
§ 371 (c)(1),
(2), (4) Date: Dec. 13, 2013

(87) PCT Pub. No.: WO2013/001640
PCT Pub. Date: Jan. 3, 2013

(65) Prior Publication Data
US 2014/0103916 A1 Apr. 17, 2014

(51) Int. Cl.
*G01B 7/30* (2006.01)
*B62K 23/04* (2006.01)
(Continued)

(52) U.S. Cl.
CPC ............... *G01B 7/30* (2013.01); *B62K 23/04* (2013.01); *F02D 11/02* (2013.01); *F02D 11/106* (2013.01);
(Continued)

(58) Field of Classification Search
CPC ............. G01R 1/06733; G01R 1/0466; G01R 1/06738; G01D 5/145; G01D 5/2451; G01D 5/00; G01D 11/245; G01P 3/487
(Continued)

(56) References Cited

U.S. PATENT DOCUMENTS 6,870,364 B2   3/2005 Sekiya
6,879,150 B2*  4/2005 Sekiya ............... 324/207.25
(Continued)

FOREIGN PATENT DOCUMENTS

CN   1440900 A   9/2003
CN   1760640 A   4/2006
(Continued)

OTHER PUBLICATIONS

Hatsumi et al, WO 2005115824A1 (English Machine Translation), "Acceleration Operation Device", Published Dec. 8, 2005.*
(Continued)

*Primary Examiner* — Melissa Koval
*Assistant Examiner* — Felicia Farrow
(74) *Attorney, Agent, or Firm* — Squire Patton Boggs (US) LLP

(57) ABSTRACT

An accelerator opening degree detection device is equipped with: a rotor that is attached to the shaft of a handlebar and rotates in conjunction with the operation of an accelerator grip; magnets attached to the rotor; magnetic sensors that detect the magnetic force of the magnets; a case that houses the rotor and the magnetic sensors, and is attached to the handlebar; and a sensor holder to which the magnetic sensors are attached, and which is housed in the case on the opposite side of the rotor with respect to the accelerator grip. The sensor holder has an inner diameter protruding part that protrudes at a location opposing the magnets, this location being on the inside of the rotor in the circumferential direction, and the magnet sensors are arranged on the inner diameter protruding part.

4 Claims, 8 Drawing Sheets

(51) Int. Cl.
*F02D 11/10* (2006.01)
*F02D 11/02* (2006.01)
(52) U.S. Cl.
CPC ...... *B62K 2202/00* (2013.01); *B62K 2204/00* (2013.01)
(58) Field of Classification Search
USPC ............... 324/7.25, 207.2, 207.11, 207.132; 180/335; 74/485, 491, 304, 551.9; 123/139, 400, 349
See application file for complete search history.

(56) References Cited

U.S. PATENT DOCUMENTS

| | | | |
|---|---|---|---|
| 6,920,805 B2 | 7/2005 | Samoto et al. | |
| 7,498,803 B2 * | 3/2009 | Horie | G01D 5/145 324/207.2 |
| 7,671,584 B2 * | 3/2010 | Uryu | G01D 5/145 324/207.25 |
| 8,072,209 B2 | 12/2011 | Jerance et al. | |
| 8,278,912 B2 | 10/2012 | Cavallo | |
| 2002/0118012 A1 * | 8/2002 | Gudgeon | G01P 3/488 324/207.15 |
| 2006/0081218 A1 | 4/2006 | Hino et al. | |
| 2006/0082361 A1 | 4/2006 | Hino et al. | |
| 2009/0201014 A1 * | 8/2009 | Cavallo | 324/207.25 |
| 2011/0036196 A1 | 2/2011 | Menghini | |
| 2011/0314955 A1 * | 12/2011 | Hiei et al. | 74/504 |
| 2013/0154623 A1 * | 6/2013 | Iwahashi | 324/207.22 |
| 2014/0145713 A1 * | 5/2014 | Watanabe | B60K 26/02 324/207.25 |

FOREIGN PATENT DOCUMENTS

| | | |
|---|---|---|
| JP | 2002-039712 A | 2/2002 |
| JP | 2002-256904 A | 9/2002 |
| JP | 2006-112284 A | 4/2006 |
| JP | 2009-013834 A | 1/2009 |
| JP | 2009-058329 A | 3/2009 |
| JP | 2009-528530 A | 8/2009 |
| JP | 2009-543730 A | 12/2009 |
| JP | 2010-151731 A | 7/2010 |
| JP | 2010-280303 A | 12/2010 |
| JP | 2012-047624 A | 3/2012 |
| TW | 590917 B | 6/2004 |
| TW | M305161 | 1/2007 |
| TW | 200944421 A1 | 11/2009 |
| TW | M374050 | 2/2010 |
| TW | M392136 | 11/2010 |
| TW | 201107183 A | 3/2011 |
| WO | 2005/115824 A1 | 12/2005 |
| WO | WO 2005115824 A1 * | 12/2005 ............ B62K 23/04 |
| WO | WO 2010092838 A1 * | 8/2010 |
| WO | WO 2011/065330 A1 | 6/2011 |

OTHER PUBLICATIONS

Taiwanese Office Action application No. 101122807 dated Dec. 23, 2013.
Japanese Office Action application No. 2013-522596 dated Aug. 5, 2014.
European Search Report application No. 11868836.5 dated Nov. 5, 2014.
International Search Report dated Aug. 9, 2011 corresponding to International Patent Application No. PCT/JP2011/065050 and English translation thereof.
State Intellectual Property Office of the People's Republic of China, Office Action and Search Report for corresponding Chinese Patent Appln. No. 201180071963.5, Sep. 1, 2015.

* cited by examiner

ACCELERATOR OPENING DEGREE DETECTION DEVICE

TECHNICAL FIELD

The present invention relates to an accelerator opening degree detection device including magnetic sensors for detecting the rotational position of an accelerator grip (also referred to as an "opening degree of an accelerator grip"), which is angularly movably mounted on a handlebar of a saddle-type vehicle such as a two-wheeled vehicle or the like.

BACKGROUND ART

Saddle-type vehicles such as two-wheeled motor vehicles (including motorized bicycles) or the like, which are powered by an internal combustion engine, include an accelerator grip that is inserted into an end of a handlebar for engagement therewith. The accelerator grip comprises an inner tube having a flange, and a grip member in the form of a rubber member that covers the outside of the inner tube and is combined integrally therewith.

Japanese Laid-Open Patent Publication No. 2006-112284 discloses an accelerator opening degree detection device including a magnet circumferentially embedded in a flange of the inner tube of an accelerator grip. The flange of the inner tube is housed in a casing, which is made up of a pair of upper and lower casing members. The casing, which is fixedly mounted on the handlebar, also accommodates a magnetic sensor therein such as a Hall IC or the like.

When the accelerator grip is turned, the angular position of the magnet is changed, thereby causing a change in the magnetic force that is detected by the magnetic sensor.

An output signal of the magnetic sensor, which represents an accelerator opening degree, is supplied through wires to a controller, which controls the opening of a throttle valve, for example.

SUMMARY OF INVENTION

With the accelerator opening degree detection device disclosed in Japanese Laid-Open Patent Publication No. 2006-112284, since the magnetic sensor is disposed outside of a rotor that rotates in unison with the accelerator grip, the magnetic sensor is susceptible to external magnetic fields. Further, the accelerator grip tends to be large in size.

The present invention has been made in view of the aforementioned problems. It is an object of the present invention to provide an accelerator opening degree detection device, which is less susceptible to external magnetic fields, and does not make the accelerator grip large in size.

According to the invention recited in claim 1, an accelerator opening degree detection device comprises a rotor mounted on a handlebar around an axis of the handlebar, the rotor being capable of being turned in unison with an accelerator grip as the accelerator grip is turned, a magnet mounted on the rotor, a magnetic sensor for detecting a magnetic force of the magnet, a case housing the rotor and the magnetic sensor, the case being mounted on the handlebar, and a sensor holder housed in the case at a position remote from the accelerator grip with the rotor interposed therebetween, the magnetic sensor being installed in the sensor holder, wherein the sensor holder includes an inner projected portion positioned radially inward of the rotor and projecting toward a position confronting the magnet, and wherein the magnetic sensor is disposed in the inner projected portion.

According to the invention recited in claim 2, in the accelerator opening degree detection device of claim 1, the magnetic sensor is housed in an inner space defined in the inner projected portion.

According to the invention recited in claim 3, the accelerator opening degree detection device of claim 1 further comprises a back yoke mounted on the rotor radially outward of the magnet.

According to the invention recited in claim 4, in the accelerator opening degree detection device of claim 3, the back yoke has bent ends, which are bent radially inward from outside of opposite circumferential side edges of the magnet.

According to the invention recited in claim 5, in the accelerator opening degree detection device of claim 1, the magnet includes a first magnet and a second magnet, the magnetic sensor includes a first magnetic sensor and a second magnetic sensor, the first magnet and the second magnet are disposed in respective positions diametrically opposite to each other across the axis of the handlebar, the first magnetic sensor detects a magnetic force of the first magnet, and the second magnetic sensor detects a magnetic force of the second magnet.

According to the invention recited in claim 6, the accelerator opening degree detection device of claim 1 further comprises a return spring having one end thereof supported in the rotor and another end thereof supported in the sensor holder, thereby normally biasing the rotor to move to a turning start point.

According to the invention recited in claim 1, since the sensor holder with the magnetic sensor assembled therein and the case are separate from each other, the magnetic sensor can be installed on the handlebar without concern over how the case is placed in alignment with the handlebar. Therefore, the magnetic sensor can be installed with increased efficiency. The sensor holder has the inner projected portion, which is positioned radially inward of the rotor with the magnet assembled therein and projecting toward a position confronting the magnet, and the magnetic sensor is disposed inside the inner projected portion. Consequently, the accelerator opening degree detection device reduces the effect that an external magnetic field has on the magnetic sensor. Further, the component around the accelerator grip is not increased in size.

According to the invention recited in claim 2, since the magnetic sensor is housed in an inner space defined in the inner projected portion, the rotor is prevented from being brought into contact with the magnetic sensor when the rotor is installed. As a result, the magnetic sensor and the magnet can easily be installed on the handlebar. Unlike the background art, the accuracy with which the magnetic sensor is installed with respect to the magnet does not depend on the dimensional accuracy of the case. In addition, the case is not susceptible to dimensional errors and backlash of the handlebar along the axis of the handlebar.

According to the invention recited in claim 3, inasmuch as the back yoke is disposed inside the rotor at a position radially outward of the magnet, the external magnetic field, which adversely affects the magnetic force of the magnet, is blocked by the back yoke. Therefore, the effect that the external magnetic field has on the magnetic force is eliminated, whereby accuracy with which the magnetic sensor detects the magnetic force of the magnet is increased.

According to the invention recited in claim 4, the back yoke has the bent ends, which are bent radially inward from outside of opposite circumferential side edges of the magnet. The back yoke with the bent ends is capable of blocking an external magnetic field over a wider area, and of eliminating external magnetic fields that adversely affect the magnetic force of the magnet. Consequently, accuracy with which the magnetic force of the magnet is detected by the magnetic sensor can be further increased.

According to the invention recited in claim 5, the magnetic sensors are disposed in respective symmetric positions on an axis perpendicular to the axis of the handlebar. For example, a failure of one of the magnetic sensors can be judged by the other magnetic sensor. Therefore, the accuracy with which failure of the magnetic sensor can be judged to have occurred or not is increased.

According to the invention recited in claim 6, since the return spring is not mounted on the case, the case can be removed without being affected by the return spring. Consequently, when the case is removed to perform maintenance, the case can easily be removed, and therefore maintainability is increased.

DESCRIPTION OF EMBODIMENTS

An accelerator opening degree detection device according to a preferred embodiment of the present invention will be described in detail below with reference to the accompanying drawings.

Figure 1:
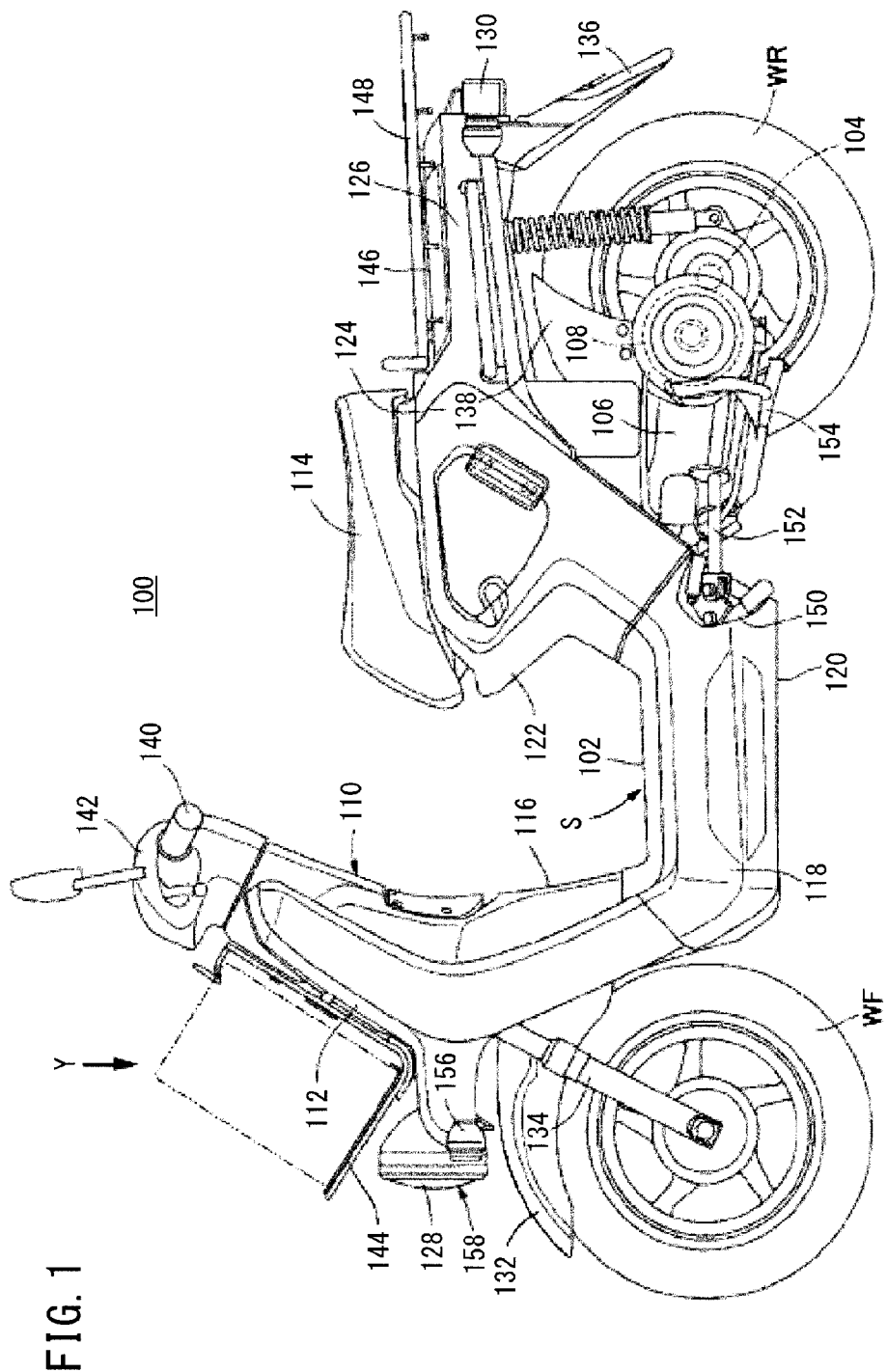
FIG. 1 is a left-hand side elevational view of a saddle-type vehicle.

FIG. 1 is a left-hand side elevational view of a saddle-type vehicle 100 such as a two-wheeled motor vehicle. The saddle-type vehicle 100 is in the form of a scooter-type electric two-wheeled vehicle having a low floor 102. The saddle-type vehicle 100 has a rear wheel WR, which is rotatable by rotational power generated by an electric motor 108 that is housed in a swing arm 106. The rear wheel WR has an axle 104 that is rotatably supported on a rear end portion of the swing arm 106.

The saddle-type vehicle 100 has a vehicle body frame, not shown, which is covered by a vehicle body cover 110 made of synthetic resin that provides a vehicle body S. The vehicle body cover 110 includes a front cover 112 covering a front side of a head pipe, not shown, of the saddle-type vehicle 100, a leg shield 116 joined to the front cover 112 for covering a front side of the legs of a rider seated on a rider seat 114, a low floor 102 joined to a lower portion of the leg shield 116 on which the feet of the rider seated on the rider seat 114 can be placed, a pair of left and right floor side covers 118 hanging down from opposite sides of the low floor 102, an under cover 120 interconnecting lower edges of the floor side covers 118, a lower seat front cover 122 covering a front side of a lower portion of the rider seat 114 and rising up from the rear end of the low floor 102, a pair of left and right side covers 124 covering opposite sides of the lower portion of the rider seat 114 and joined to opposite sides of the lower seat front cover 122, and a rear cover 126 covering an upper side of the rear wheel WR and joined to the side covers 124.

A headlight 128 is mounted on the front end of the front cover 112, and a taillight 130 is mounted on the rear end of the rear cover 126. A front fender 132, which is disposed below the front cover 112, is mounted on a front fork 134 that rotatably supports a front wheel WF. The front fender 132 is disposed in covering relation to an upper side of the front wheel WF. A rear fender 136, which covers a rear upper side of the rear wheel WR, is joined to the rear cover 126. A fender 138 also is mounted on a front portion of the swing arm 106 for covering a front upper side portion of the rear wheel WR.

A handle 140 is joined to an upper portion of the front fork 134. The front wheel WF can be steered by the handle 140. The handle 140 has a front portion covered with a handle cover 142. A front carrier 144 is disposed in front of the front cover 112. A luggage base 146 is disposed behind the rider seat 114 and above the rear cover 126. A carrier 148 is disposed above the luggage base 146.

The vehicle body frame of the saddle-type vehicle 100 includes a pivot plate 150. A side stand 152, which holds the vehicle body S in an upright position while being tilted to the left, is angularly and movably mounted on the pivot plate 150. The swing arm 106 has a front portion, which is swingably supported on the pivot plate 150. A main stand 154 is angularly and movably mounted on the front portion of the swing arm 106.

Figure 2:
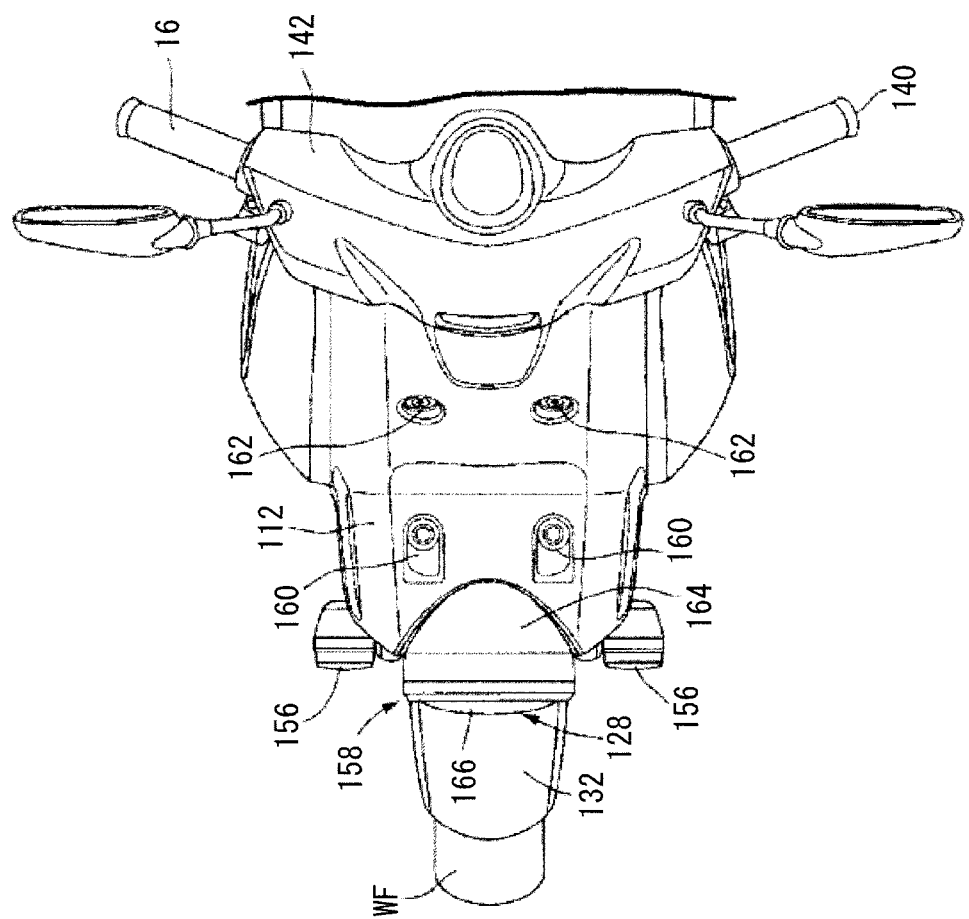
FIG. 2 is a view of the saddle-type vehicle taken along the arrow Y of FIG. 1, with a front carrier thereof omitted from illustration.

As shown in FIG. 2, winkers 156 are disposed as a pair respectively on left and right sides of the headlight 128. The winkers 156 are formed integrally with the headlight 128 in a unitary manner to constitute a lamp unit 158. The front cover 112 includes first recesses 160 and second recesses 162, which are inwardly concave. The front carrier 144 has holes defined therein, which correspond respectively to the first recesses 160 and the second recesses 162. After the holes in the front carrier 144 have been positioned in alignment respectively with the first recesses 160 and the second recesses 162, bolts are inserted therethrough in order to fix the front carrier 144 and the front cover 122 to the vehicle body frame. The headlight 128 has a housing 164, which is teardrop-shaped in side elevation, and a lens 166, which is circular in front elevation and is mounted on the front end of the housing 164. An accelerator grip 16 is mounted on a right-hand side of the handle 140. The electric motor 108 is energized so as to rotate at a speed that depends on the angle through which the accelerator grip 16 is turned by the rider.

Figure 3:
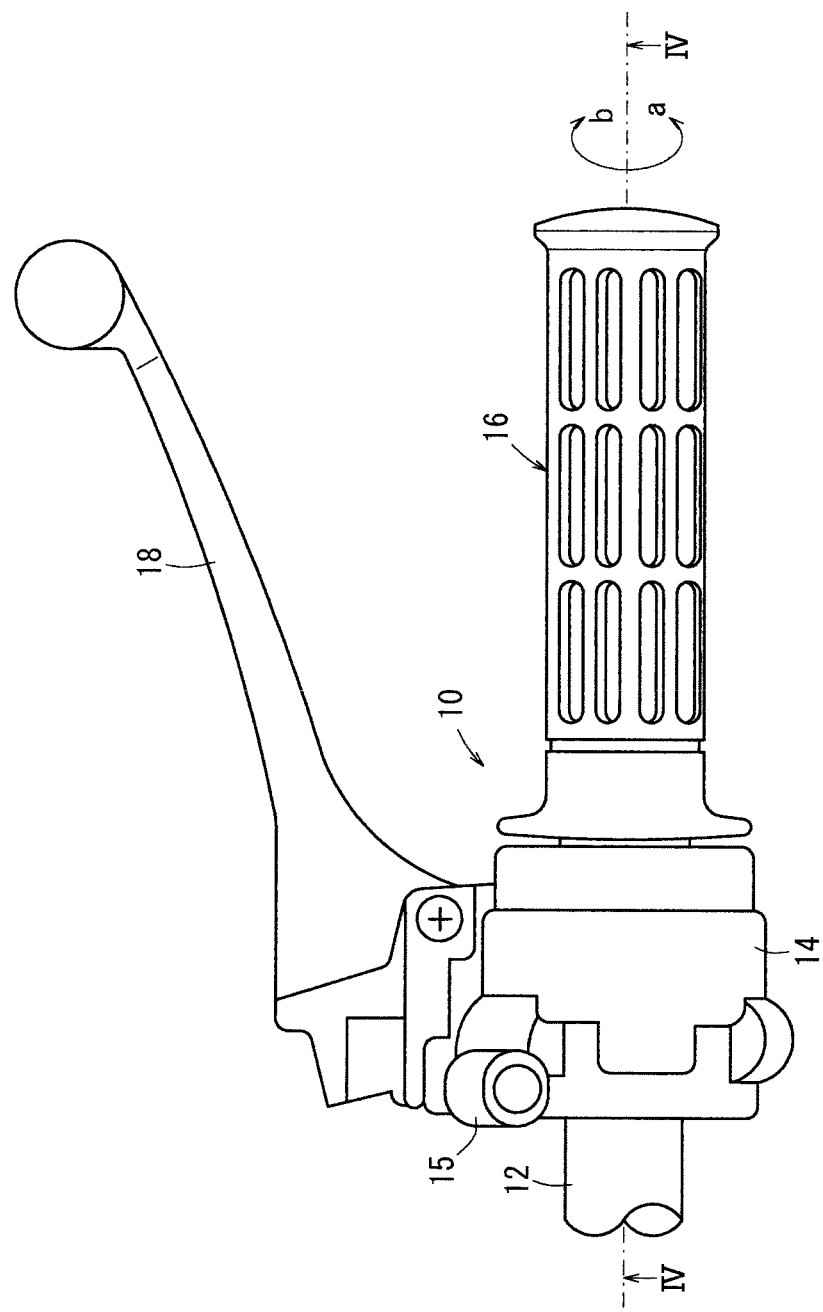
FIG. 3 is a view of an accelerator opening degree detection device according to an embodiment of the present invention, which is incorporated in the saddle-type vehicle.
Figure 4:
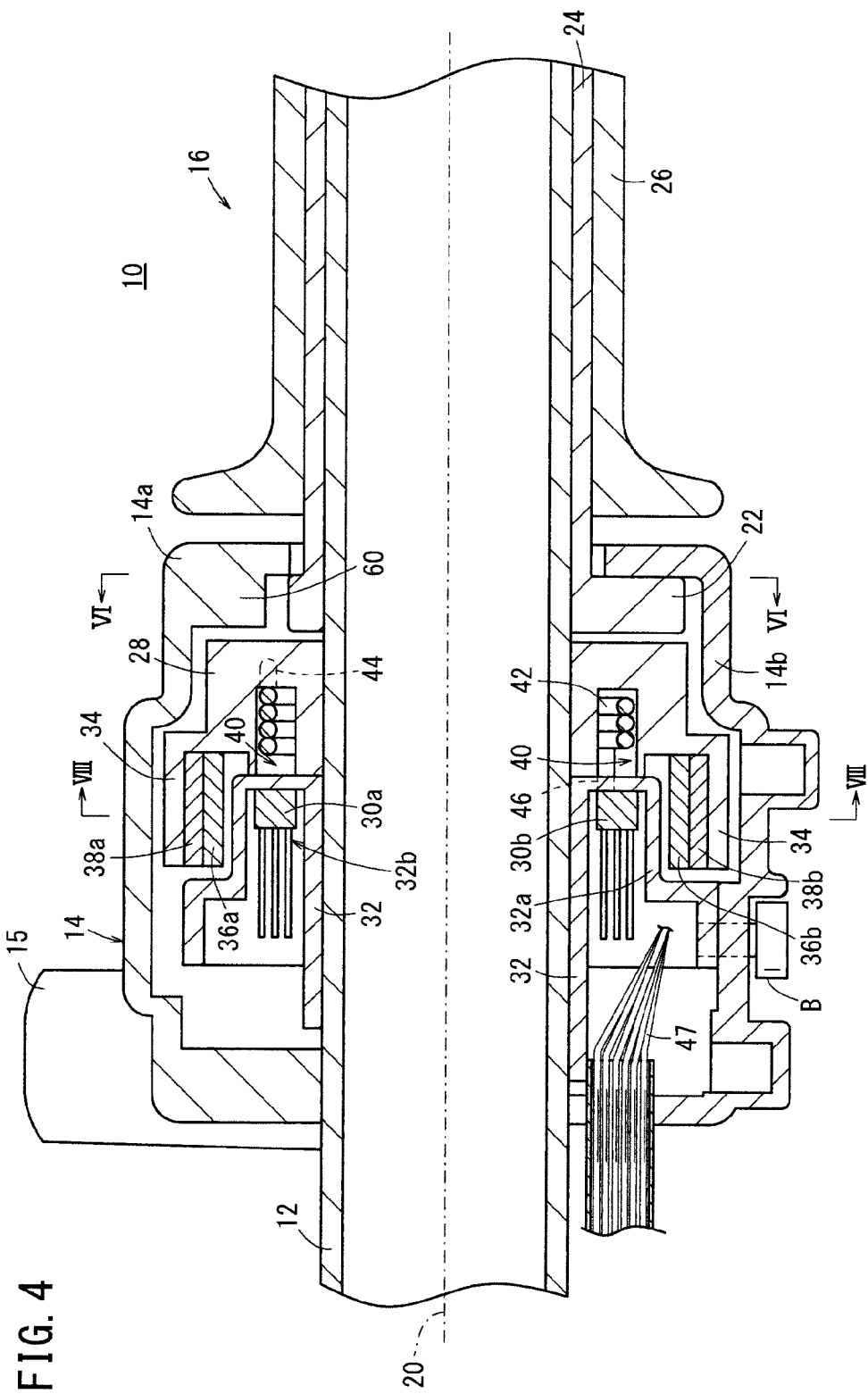
FIG. 4 is a fragmentary cross-sectional view taken along line IV-IV of FIG. 3.

FIG. 3 is a view of an accelerator opening degree detection device 10 according to an embodiment of the present invention, which is incorporated in the saddle-type vehicle 100. The accelerator opening degree detection device 10 includes a handlebar 12, a case (casing) 14 mounted on the handlebar 12, and the accelerator grip 16, which is mounted on one end portion of the handlebar 12. FIG. 3 also shows a brake lever 18 that is mounted on the case 14 for facilitating understanding of the present invention, although the brake lever 18 does not have a direct bearing on the present invention. In FIG. 4 and the following figures, the brake lever 18 and other components, which are not required for description of the present invention, are omitted from illustration.

Figure 5:
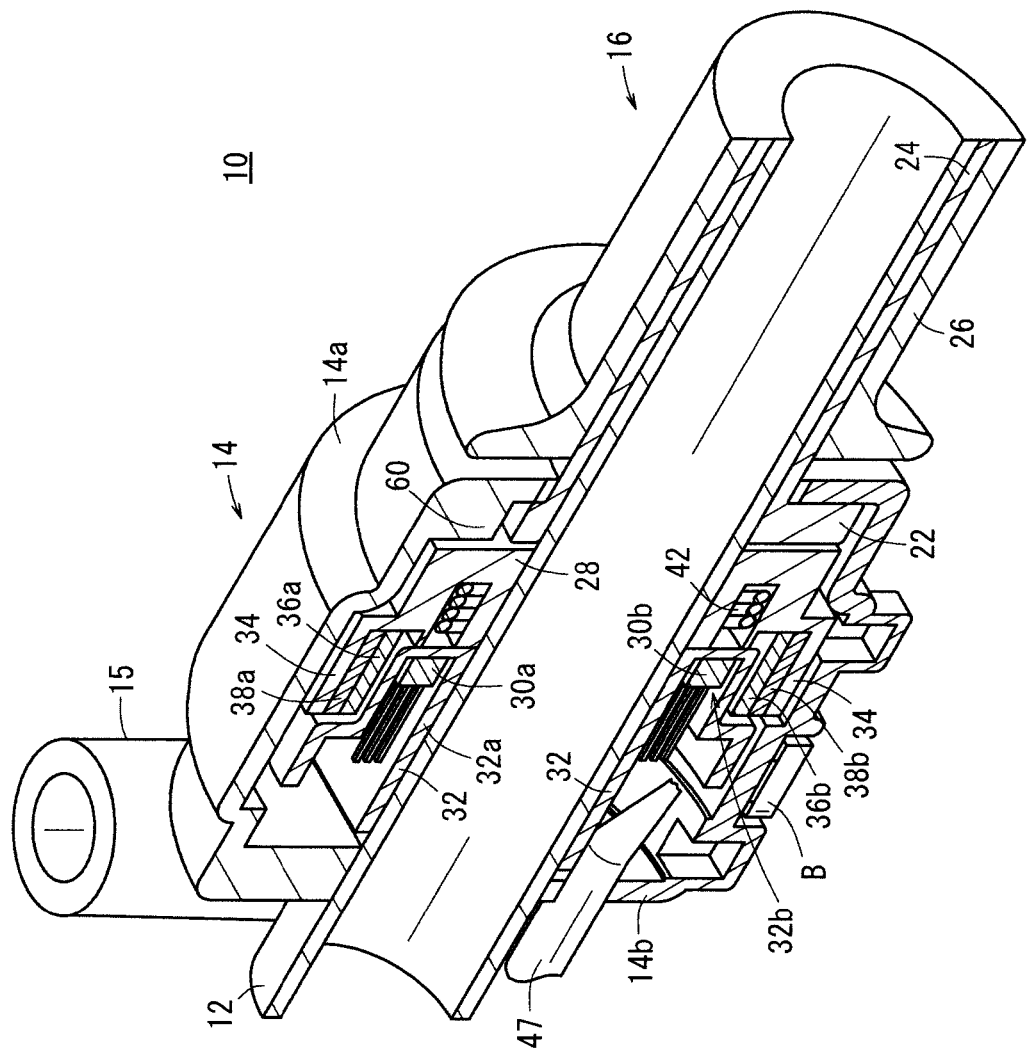
FIG. 5 is a perspective view, partially in cross section, of the accelerator opening degree detection device shown in FIG. 4.

FIG. 4 is a fragmentary cross-sectional view taken along line IV-IV of FIG. 3. FIG. 5 is a perspective view, partially in cross section, of the accelerator opening degree detection device 10 shown in FIG. 4. Reference numeral 20 represents the axis (central axis) of the handlebar 12.

As shown in FIGS. 4 and 5, the accelerator grip comprises a hollow throttle member 24 having a flange 22, which is fitted over the hollow handlebar 12, and a grip sleeve 26 made of resin or the like, and which is fixedly mounted on the outer circumferential surface of the throttle member 24. The accelerator grip 16 is angularly movably (rotatably) mounted on the handlebar 12. The case 14 houses therein a rotor 28, which is disposed around the axis 20 of the handlebar 12 for angular movement in unison with the accelerator grip 16 as the rotor 28 turns in the direction indicated by the arrow a in FIG. 3, and a sensor holder 32. The sensor holder 32 is of a hollow, substantially two-stepped cylindrical shape, and holds respective Hall ICs (magnetic sensors) 30a, 30b thereon. In other words, the case 14 serves as a casing that covers the rotor 28 and the sensor holder 32 in a protected manner. The sensor holder 32 is housed in the case 14 at a position remote from the accelerator grip 16 with the rotor 28 interposed therebetween.

The rotor 28 has a protrusion 34 that projects toward the sensor holder 32. The protrusion 34 supports magnets 36a, 36b and back yokes 38a, 38b thereon. The back yokes 38a, 38b are disposed on an outer circumferential side relative to the magnets 36a, 36b. The protrusion 34, the magnets 36a, 36b, and the back yokes 38a, 38b are disposed radially outward of a hollow cylindrical member, which has a shorter radius (hereinafter referred to as an "inner projected portion 32a"), of the sensor holder 32, which is of a substantially two-stepped cylindrical shape. The Hall ICs 30a, 30b are disposed inside of an outer circumferential surface of the inner projected portion 32a. The inner projected portion 32a projects toward a position that confronts the magnets 36a, 36b, at a location located inward of the circumferential direction of the rotor 28 (the protrusion 34 of the rotor 28). The Hall ICs 30a, 30b are accommodated in an inner space 32b, which is defined in the inner projected portion 32a.

In this manner, the magnets 36a, 36b and the back yokes 38a, 38b are disposed outside of the Hall ICs 30a, 30b in the sensor holder 32. The Hall IC (first magnetic sensor) 30a detects a magnetic force of the magnet (first magnet) 36a in order to detect a turning angle of the rotor 28 (the opening degree of the accelerator grip 16), whereas the Hall IC (second magnetic sensor) 30b detects a magnetic force of the magnet (second magnet) 36b in order to detect a turning angle of the rotor 28 (the opening degree of the accelerator grip 16). The back yokes 38a, 38b block external magnetic fields that could adversely affect the magnetic forces of the magnets 36a, 36b, thus resulting in an increase in detection accuracy of the magnetic forces of the magnets 36a, 36b by the Hall ICs 30a, 30b.

The sensor holder 32 covers the Hall ICs 30a, 30b, so as to prevent the Hall ICs 30a, 30b from coming into contact with the outer components. A portion of the sensor holder 32 is interposed between the magnets 36a, 36b and the Hall ICs 30a, 30b, thereby preventing the magnets 36a, 36b and the Hall ICs 30a, 30b from coming into contact with each other. The sensor holder 32 also prevents the rotor 28 and the Hall ICs 30a, 30b from contacting each other in directions along the axis 20.

The rotor 28 has a groove 40 defined therein, which houses a return spring 42 between the groove 40 and the sensor holder 32, for normally biasing the rotor 28 to move in the direction indicated by the arrow b in FIG. 3. The return spring 42 has one end that engages and is supported by a hole 44 defined in the rotor 28, and another end that engages and is supported by a hole 46 defined in the sensor holder 32. The sensor holder 32 and the case 14 are fixed to the handlebar 12 by a bolt B. The bolt B also fastens the sensor holder 32 and the case 14 to each other. The case 14 comprises an upper case 14a and a lower case 14b. Detection signals, which are generated by the Hall ICs 30a, 30b, are transmitted over wires 47 to a controller such as an ECU (Engine Control Unit) or the like, which is mounted on the saddle-type vehicle. The upper case 14a has a mounting boss 15 on which a non-illustrated side mirror is mounted.

Figure 6:
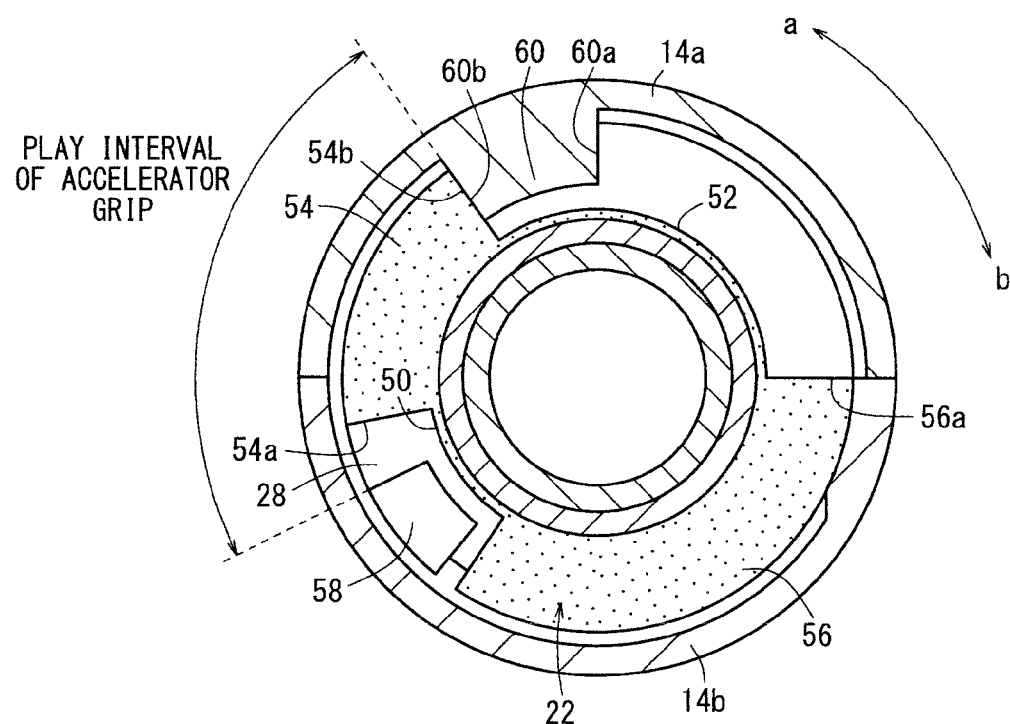
FIG. 6 is a cross-sectional view taken along line VI-VI of FIG. 4.
Figure 7:
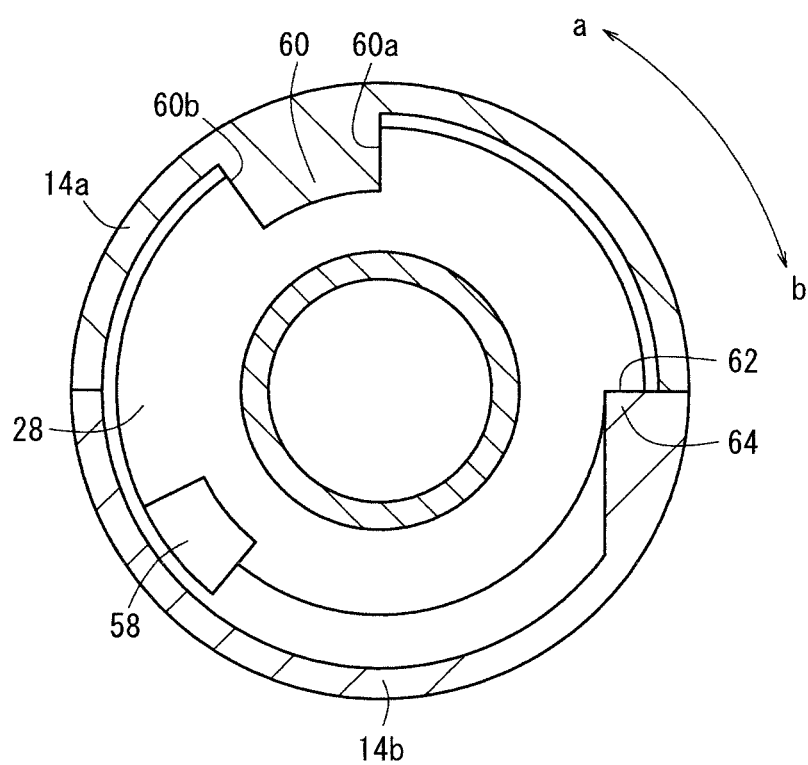
FIG. 7 is a cross-sectional view similar to FIG. 6 except that a flange is omitted from illustration.

FIG. 6 is a cross-sectional view taken along line VI-VI of FIG. 4, and FIG. 7 is a cross-sectional view similar to FIG. 6, except that the flange 22 is omitted from illustration.

As shown in FIG. 6, the flange 22 of the throttle member 24 has recesses 50, 52, with a small flange sector 54 and a large flange sector 56 defined between the recesses 50, 52. The rotor 28 has a tooth 58 that projects toward the flange 22 and is positioned in the recess 50. The upper case 14a has a stopper 60 that projects radially inward (toward the flange 22) and is positioned in the recess 52. The stopper 60 limits rotational movement of the accelerator grip 16 in the direction indicated by the arrow a, and also limits rotational movement of the accelerator grip 16 in the direction indicated by the arrow b.

As shown in FIG. 7, the rotor 28 also has a recess 62 defined therein. The lower case 14b has a stopper 64 for limiting rotational movement of the rotor 28 in the direction indicated by the arrow b under the bias of the return spring 42. When an edge of the recess 62 abuts against the stopper 64, the rotor 28 is prevented from rotating further in the direction indicated by the arrow b. When the rotor 28 abuts against the stopper 64, the angular position of the rotor 28 is referred to as a turning start point. In other words, the rotor 28 is biased to return to the turning start point.

When the rider turns the accelerator grip 16 in the direction indicated by the arrow a, a first abutment surface 54a of the small flange sector 54 moves in the direction of the arrow a, whereupon the first abutment surface 54a comes into abutment against the tooth 58. When the rider further turns the accelerator grip 16 in the direction of the arrow a, the small flange sector 54 and the tooth 58 move together in the direction of the arrow a. At this time, the rotor 28 turns and the Hall ICs 30a, 30b detect the turning angle of the rotor 28. When the rider turns the accelerator grip 16 to a certain angular position, a fully open abutment surface 56a of the large flange sector 56 comes into abutment against a fully open stopper surface 60a of the stopper 60, thereby preventing the accelerator grip 16 from turning further in the direction of the arrow a.

Thereafter, when the rider subsequently releases the accelerator grip 16 (reverses the direction in which the accelerator grip 16 is turned), the small flange sector 54 and the tooth 58 are turned by the return spring 42 in the direction indicated by the arrow b. The rotor 28 and the accelerator grip 16 are turned in the direction of the arrow b until the edge of the recess 62 of the rotor 28 abuts against the stopper 64, whereupon the rotor 28 is stopped at the turning start point. Even if the rotor 28 returns to the turning start point, the accelerator grip 16 continues to turn in the direction of the arrow b until a second abutment surface 54b of the small flange sector 54 comes into abutment against an excessive return prevention stopper surface 60b of the stopper 60, at which time the rotor 28 stops turning. An interval between the position at which the second abutment surface 54b of the small flange sector 54 abuts against the excessive return prevention stopper surface 60b of the stopper 60 and the position at which the first abutment surface 54a abuts against the tooth 58 is referred to as a play interval of the accelerator grip 16. Accordingly, the tooth 58 serves to transmit turning movement of the accelerator grip 16 to the rotor 28. The stopper 60 serves as a limiting member for limiting turning movement of the accelerator grip 16 (turning movement of the accelerator grip 16 in the direction of the arrow a, as well as turning movement of the accelerator grip 16 in the direction of the arrow b).

Figure 8:
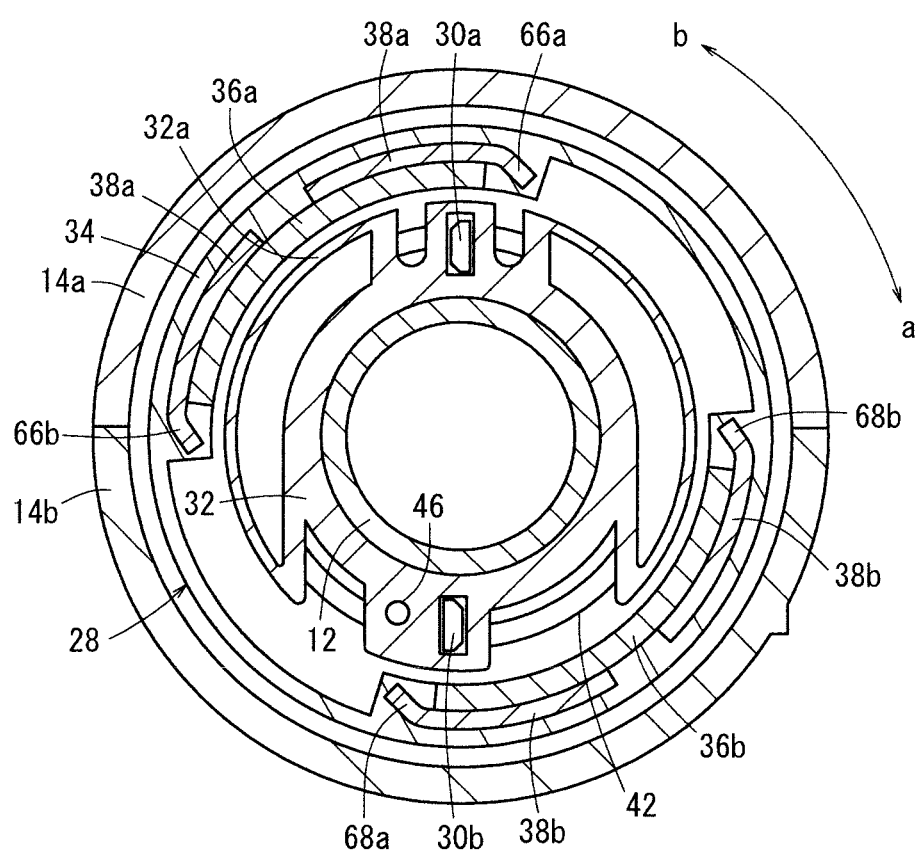
FIG. 8 is a cross-sectional view taken along line VIII-VIII of FIG. 4.

FIG. 8 is a cross-sectional view taken along line VIII-VIII of FIG. 4. The magnets 36a, 36b are disposed in respective positions, which are diametrically opposite to each other across the axis 20 of the handlebar 12, and the magnets 36a, 36b are curved along the circumferential direction of the handlebar 12. The back yokes 38a, 38b are disposed respectively on outer circumferential surfaces of the magnets 36a, 36b. The back yokes 38a, 38b open centrally along the axis 20. The back yokes 38a, 38b are curved along the circumferential direction of the handlebar 12. The back yoke 38a has bent ends 66a, 66b, which are bent radially inward from outside of the opposite outer circumferential side edges of the magnet 36a, and the back yoke 38b has bent ends 68a, 68b, which are bent radially inward from outside of the opposite outer circumferential side edges of the magnet 36b. The back yokes 38a, 38b including the bent ends 66a, 66b, 68a, 68b thereof are capable of blocking an external magnetic field over a wider area, and of further eliminating an external magnetic field that adversely affects the magnetic forces of the magnets 36a, 36b, thereby resulting in a further increase in the accuracy with which the Hall ICs 30a, 30b are capable of detecting the magnetic forces of the magnets 36a, 36b. The back yokes 38a, 38b need not necessarily open centrally along the axis 20.

The opening degree of the accelerator grip 16 may be detected by either one of the Hall ICs 30a, 30b, whereas the other one of the Hall ICs 30a, 30b may be used to judge whether or not the Hall IC used to detect the opening degree of the accelerator grip 16 has failed. For example, only the Hall IC 30a may be used to detect the opening degree of the accelerator grip 16, whereas the Hall IC 30b may be used to judge whether or not the Hall IC 30a has failed. If the opening degree of the accelerator grip 16, which is detected by the Hall IC 30a, and the opening degree of the accelerator grip 16, which is detected by the Hall IC 30b, differ from each other, then the controller can determine that the Hall IC 30a has failed.

A process of assembling the accelerator opening degree detection device 10 will be described below. After the sensor holder 32 with the Hall ICs 30a, 30b assembled therein has been fitted over the handlebar 12 from one end thereof and positioned on the handlebar 12, the rotor 28 with the return spring 42 placed therein also is fitted over the handlebar 12 from the one end thereof and is mounted on the handlebar 12. At this time, one end of the return spring 42 engages and is supported in the hole 44 defined in the rotor 28, whereas the other end of the return spring 42 engages and is supported in the hole 46 defined in the sensor holder 32.

Next, the accelerator grip 16 is fitted over the handlebar 12 from the one end thereof. When the accelerator grip 16 is fitted over the handlebar 12, as shown in FIG. 6, the accelerator grip 16 is positioned such that the small flange sector 54 and the large flange sector 56 of the flange 22 sandwich the tooth 58 therebetween. Further, at this time, the accelerator grip 16 is positioned such that the tooth 58 is positioned in the recess 50 defined in the flange 22.

Thereafter, the lower case 14b is fitted over the sensor holder 32, the rotor 28, and the flange 22 of the accelerator grip 16, such that the stopper 64 fits in the recess 62 defined in the rotor 28 (see FIG. 7). In addition, the upper case 14a is fitted over the sensor holder 32, the rotor 28, and the flange 22 of the accelerator grip 16, such that the stopper 60 fits in the recess 52 defined in the flange 22 (see FIG. 6). The upper case 14a, the lower case 14b, and the sensor holder 32 are fastened to the handlebar 12 by the bolt B, thereby completing assembly of the accelerator opening degree detection device 10.

Since the sensor holder 32 with the Hall ICs 30a, 30b assembled therein and the case 14 are separate from each other, the Hall ICs 30a, 30b can be installed on the handlebar 12 without concern over how the case 14 is placed in alignment with the handlebar 12. Therefore, the Hall ICs 30a, 30b can be installed with increased efficiency. The sensor holder 32 includes the inner projected portion 32a, which is positioned radially inward of the rotor 28 with the magnets 36a, 36b assembled therein, and which projects toward the position confronting the magnets 36a, 36b, while in addition, the Hall ICs 30a, 30b are disposed on the inner projected portion 32a. Consequently, the accelerator opening degree detection device 10 reduces the effect that the external magnetic field has on the Hall ICs 30a, 30b, and does not make the component (i.e., the case 14) around the accelerator grip 16 large in size.

Since the Hall ICs 30a, 30b are housed in the inner space 32b defined in the inner projected portion 32a, the rotor 28 is prevented from coming into contact with the Hall ICs 30a, 30b when the rotor 28 is installed. As a result, the Hall ICs 30a, 30b and the magnets 36a, 36b can easily be installed on the handlebar 12. Unlike the background art, installation accuracy of the Hall ICs 30a, 30b with respect to the magnets 36a, 36b does not depend on the dimensional accuracy of the case 14, and the case 14 is not susceptible to dimensional errors and backlash of the handlebar 12 along the axis 20 of the handlebar 12.

Inasmuch as the back yokes 38a, 38b are disposed in the rotor 28 at a radially outward position from the magnets 36a, 36b, external magnetic fields, which could adversely affect the magnetic forces of the magnets 36a, 36b, are blocked by the back yokes 38a, 38b. Thus, any effect that the external magnetic field may produce on the magnetic forces of the magnets 36a, 36b is eliminated, thereby enhancing accuracy with which the magnetic forces of the magnets 36a, 36b are detected by the Hall ICs 30a, 30b.

The back yokes 38a, 38b include the bent ends 66a, 66b, 68a, 68b, which are bent radially inward from outside of the opposite circumferential side edges of the magnets 36a, 36b. The back yokes 38a, 38b, which include the bent ends 66a, 66b, 68a, 68b, are capable of blocking external magnetic fields over a wider area, and of eliminating external magnetic fields that adversely affect the magnetic forces of the magnets 36a, 36b, thereby resulting in a further increase in accuracy with which the Hall ICs 30a, 30b detect the magnetic forces of the magnets 36a, 36b.

The magnets 36a, 36b are disposed in respective positions, which are diametrically opposite to each other across the axis 20 of the handlebar 12. The Hall IC 30a detects the magnetic force of the magnet 36a, whereas the Hall IC 30b detects the magnetic force of the magnet 36*b*. The Hall IC 30*a* may be used to detect the angle of rotation of the rotor 28, whereas the Hall IC 30*b* may be used to judge whether the Hall IC 30*a* has failed or not. Therefore, whether or not the Hall IC 30*a* has failed can be judged with increased accuracy.

Insofar as the return spring 42 is not mounted on the case 14, the return spring 42 is not dislodged even at times that the case 14 is removed for maintenance. Consequently, the case 14 can easily be removed for improving ease of maintenance.

The present invention has been described above with respect to a preferred embodiment thereof. However, the technical scope of the present invention is not limited to the embodiment illustrated above. It will be obvious to those skilled in the art that various improvements or modifications can be made with respect to the aforementioned embodiment. It is apparent from the scope of the claims that configurations, which are based on such improvements or modifications, fall within the technical scope of the present invention. The parenthetical reference characters, which are referred to in the patent claims, correspond with the reference characters shown in the accompanying drawings for thereby facilitating understanding of the present invention. However, the present invention should not be construed as being limited to the elements denoted by such reference characters.

The invention claimed is:

1. An accelerator opening degree detection device comprising:
   a rotor mounted on a handlebar around an axis of the handlebar, the rotor being capable of being turned in unison with an accelerator grip as the accelerator grip is turned;
   a magnet mounted on the rotor;
   a magnetic sensor for detecting a magnetic force of the magnet;
   a case housing the rotor and the magnetic sensor, the case being mounted on the handlebar; and
   a sensor holder housed in the case at a position remote from the accelerator grip with the rotor interposed therebetween, the magnetic sensor being installed in the sensor holder;
   wherein the sensor holder is supported by the case and has a two-stepped cylindrical shape, which is formed such that an inner diameter and an outer diameter of the sensor holder are shorter on a rotor side of the sensor holder than on another side of the sensor holder,
   wherein an inner projected portion that is a cylindrical member of the two-stepped cylindrical shape having the shorter inner diameter and the shorter outer diameter is positioned radially inward of the rotor, and the inner projected portion projects toward a position confronting the magnet, and
   wherein the magnetic sensor is housed in an inner space defined in the inner projected portion,
   wherein the accelerator opening degree detection device further comprises:
   a return spring having one end thereof supported in the rotor and another end thereof supported in the sensor holder, the return spring being thereby for normally biasing the rotor to move to a turning start point;
   wherein the rotor has a groove defined therein, which houses the return spring between the groove and the sensor holder and the return spring has one end that engages and is supported by a hole defined in the rotor and another end that engages and is supported by a hole defined in the sensor holder.

2. The accelerator opening degree detection device according to claim 1, further comprising:
   a back yoke mounted on the rotor radially outward to the magnet.

3. The accelerator opening degree detection device according to claim 2, wherein the back yoke has bent ends, which are bent radially inward from outside of opposite circumferential side edges of the magnet.

4. The accelerator opening degree detection device according to claim 1, wherein the magnet includes a first magnet and a second magnet;
   the magnetic sensor includes a first magnetic sensor and a second magnetic sensor;
   the first magnet and the second magnet are disposed in respective positions diametrically opposite to each other across the axis of the handlebar;
   the first magnetic sensor detects a magnetic force of the first magnet; and
   the second magnetic sensor detects a magnetic force of the second magnet.

* * * * *